G. W. Davis,
Belt Tightener.
Nº 28,353. Patented May 22, 1860.
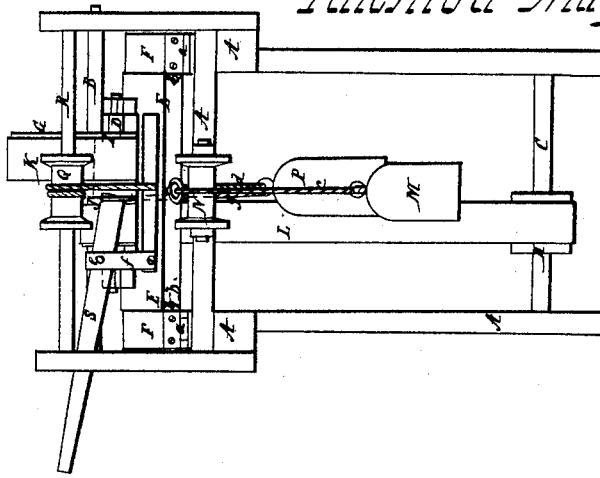
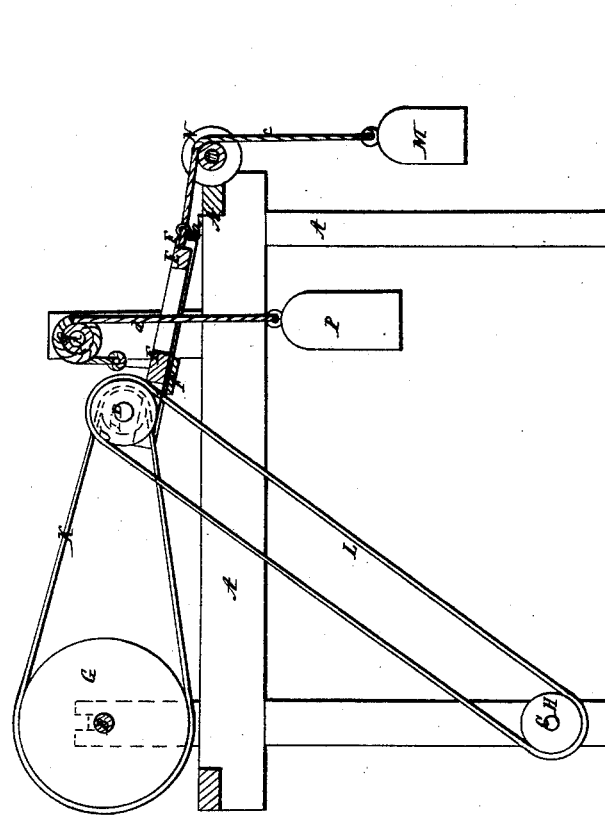
Witnesses:
Inventor:
G. W. Davis

UNITED STATES PATENT OFFICE.

G. W. DAVIS, OF BROOKLYN, NEW YORK.

ARRANGEMENT OF COUNTER-SHAFTS.

Specification of Letters Patent No. 28,353, dated May 22, 1860.

*To all whom it may concern:*

Be it known that I, G. W. DAVIS, of Brooklyn, county of Kings, State of New York, have invented a new and Improved Arrangement of Counter-Shaft in Machines; and I do hereby declare that the following is a full, clear, and exact description of the same, reference being had to the annexed drawings, forming part of this specification, in which—

Figure 1, is a vertical section view exhibiting the application of my contrivance. Fig. 2, is an elevation at right angles to Fig. 1.

Similar letters of reference indicate corresponding parts in both figures.

My invention relates to an arrangement of counter-shaft or intermediate shaft and pulley or pulleys between a driving shaft, and a shaft to be driven by it, whereby the belt running from the driving shaft, to the intermediate shaft, to the shaft to be driven are both kept at a uniform tension notwithstanding any expansion and contraction of the belts, or any untrue wear, or settling of the driving shaft or machinery, and whereby provision is afforded for regulating the tension of the said belts according to the amount of power required to be transmitted, and for letting the said belts slack, when the transmission of power is desired to be suspended.

To enable others skilled in the art to make and use my invention I will proceed to describe its construction and operation.

A represents a framing supporting all the parts necessary to illustrate my invention. This framing is perhaps not of such form as will ever be used in practice, as in most cases the bearings of the driving shaft will have supports entirely independent of the framing of the machinery to be driven.

B, is the driving shaft and C, the shaft to be driven, each arranged to rotate in fixed bearings, B, carrying a driving pulley G; and C, being furnished with a pulley H.

D, is the intermediate shaft arranged parallel, or as nearly so as practicable, with B, and C, in bearings in a carriage E, which is fitted to slide within guides *b*, *b*, in a gate F, which is hinged or jointed as shown at *a*, *a*, to the framing A, or to any suitable fixed support, the axis of its hinge or joint being parallel with the shaft D, and the sliding movement of the carriage E, within the gate F, being in a direction at right angles to the axis of the said shaft. The said shaft is furnished with two pulleys I, and J, one to receive a belt K, which runs the driving pulley G, and the other a belt L, which runs on the pulley H, of the shaft C; but one pulley may be made to serve for the two belts.

The gate F, is so arranged relatively to the shafts B, and C, that its swinging movement, will tighten or loosen the belt L, and that the sliding movement of the carriage E, in the guides *b*, *b*, will tighten or loosen the belt K, and to some extent the belt L.

M, is a weight attached to the carriage E, by a cord *c*, which is arranged to run over a guide pulley N, so arranged that the said weight will exert a tendency to draw the carriage back toward the axis of oscillation *a*, of the gate F, and so keep the belt K, tight.

P, is a weight attached to the carriage E, by a cord *d*, one or two turns of which are taken around a pulley Q, on a shaft R, that is so arranged to run in fixed bearings that the said weight will tend to raise the carriage E, and gate F, together and so keep the belt L, tight. The above weights M, and P, produce a greater or less tension of the belts, according as they are more or less heavy; and whatever that tension may be it is always uniform, and entirely independent of the expansion or contraction of the belts, or of any settling or wearing of the bearings of the shafts B, and C, and by adding to, or taking from the said weights or by changing them for heavier or lighter ones the tension of the belts may be made just sufficient to produce the friction necessary for the amount of power required, without any slip of the belt, and without any loss of power being produced by unnecessary friction.

S, is a lever arranged to work in a fixed fulcrum *e*, in a support *f*, attached to the carriage E. The shorter arm of this lever is attached by a cord *g*, to the weight P, and by pressing down the longer arm by hand the said cord is made to raise the said weight, and take the heft of it from the cord *d*, and bring it directly on to the carriage E, and gate F, so that instead of tending to draw up the said carriage and gate, and tightening the belt L, it will tend to depress them and slacken the said belt, and thereby prevent the said belt, transmitting motion to the pulley H. This lever might be attached to the gate F, instead of to the carriage E.

Instead of the weights M and P, springs may be applied to the gate F, and carriage E, to operate in a similar manner.

What I claim as my invention and desire to secure by Letters Patent is—

1. The yielding counter-shaft or intermediate shaft (D) suspended upon and attached to the carriage as described, and in relation to the shafts (B) and (C) as herein set forth.

2. The lever S, in combination with the gate F, and the weight P, substantially as and for the purpose herein specified.

G. W. DAVIS.

Witnesses:
WM. THOMPSON,
B. GIROUD.